(12) United States Patent
Yoo et al.

(10) Patent No.: US 11,913,702 B2
(45) Date of Patent: Feb. 27, 2024

(54) COOLING SYSTEM INCLUDING A PLURALITY OF COOLING UNITS

(71) Applicant: MH TECHNOLOGIES INC., Incheon (KR)

(72) Inventors: Jin-Ho Yoo, Seoul (KR); Jung Hoon Lee, Siheung-si (KR)

(73) Assignee: MH TECHNOLOGIES INC., Incheon (KR)

( * ) Notice: Subject to any disclaimer, the term of this patent is extended or adjusted under 35 U.S.C. 154(b) by 168 days.

(21) Appl. No.: 17/442,408

(22) PCT Filed: Dec. 30, 2020

(86) PCT No.: PCT/KR2020/019359
§ 371 (c)(1),
(2) Date: Sep. 23, 2021

(87) PCT Pub. No.: WO2022/145531
PCT Pub. Date: Jul. 7, 2022

(65) Prior Publication Data
US 2023/0086921 A1 Mar. 23, 2023

(30) Foreign Application Priority Data
Dec. 29, 2020 (KR) .......................... 10-2020-0186544

(51) Int. Cl.
*F25B 1/00* (2006.01)
*F25D 17/02* (2006.01)
*F28D 21/00* (2006.01)

(52) U.S. Cl.
CPC ............. *F25D 17/02* (2013.01); *F28D 21/00* (2013.01); *F28D 2021/0028* (2013.01)

(58) Field of Classification Search
CPC ... F25D 17/02; F28D 21/00; F28D 2021/0028
(Continued)

(56) References Cited

U.S. PATENT DOCUMENTS 3,907,025 A 9/1975 Malcosky et al.
10,520,237 B2 12/2019 Heo et al.
(Continued)

FOREIGN PATENT DOCUMENTS

CN 111120337 A 5/2020
JP 2009170378 A * 7/2009
(Continued)

*Primary Examiner* — Davis D Hwu
(74) *Attorney, Agent, or Firm* — Birch, Stewart, Kolasch & Birch, LLP

(57) ABSTRACT

A cooling system is disclosed. The cooling system may comprise a first cooling unit installed at a cooling target, the first cooling unit including a first cooling pipe forming a flow path of a first refrigerant; and a second cooling unit installed at the cooling target, the second cooling unit including a second cooling pipe forming a flow path of a second refrigerant, wherein the first cooling pipe includes a first cooling pipe first end adjacent to a first side of the cooling target, the first refrigerant being introduced into the first cooling pipe first end; and a first cooling pipe second end adjacent to a second side of the cooling target, the first refrigerant being discharged from the first cooling pipe second end, wherein the second cooling pipe includes a second cooling pipe first end adjacent to the first side of the cooling target, the second refrigerant being discharged from the second cooling pipe first end; and a second cooling pipe second end adjacent to the second side of the cooling target, the second refrigerant being introduced into the second cooling pipe second end.

13 Claims, 5 Drawing Sheets

(58) Field of Classification Search
USPC .......................................................... 62/498
See application file for complete search history.

(56)     References Cited

U.S. PATENT DOCUMENTS

2006/0125332 A1    8/2006   Tolle et al.
2016/0096414 A1    4/2016   Michikawauchi

FOREIGN PATENT DOCUMENTS

| JP | 6032255 B2 | 11/2016 |
|---|---|---|
| KR | 10-2005-0057374 A | 6/2005 |
| KR | 10-1040988 B1 | 6/2011 |
| KR | 10-1410438 B1 | 6/2014 |
| KR | 10-2019-0051234 A | 5/2019 |
| KR | 10-2019-0097672 A | 8/2019 |
| KR | 10-2168630 B1 | 10/2020 |
| TW | 202032069 A * | 9/2020 |

\* cited by examiner

[FIG. 1]
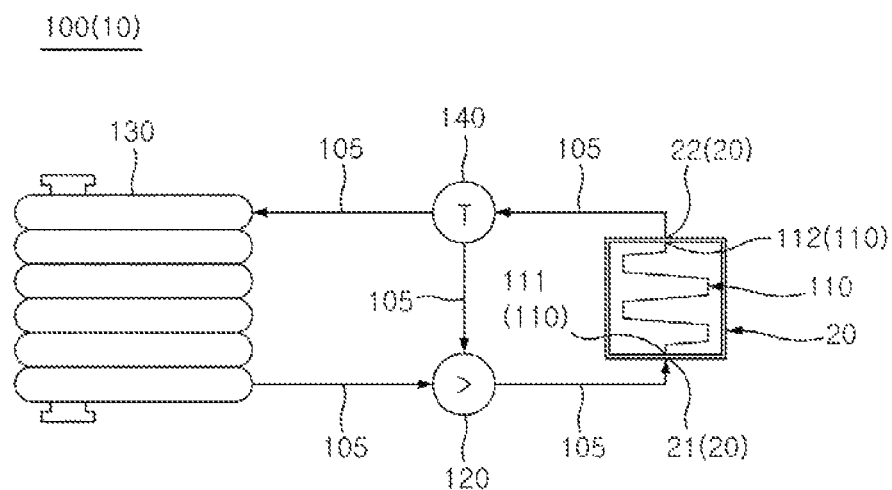
[FIG. 2]
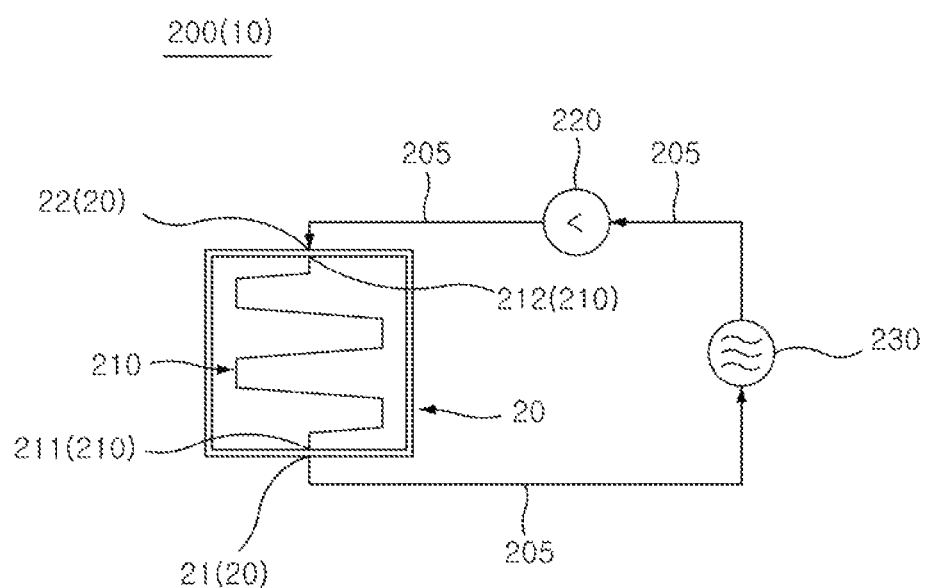

[FIG. 3]
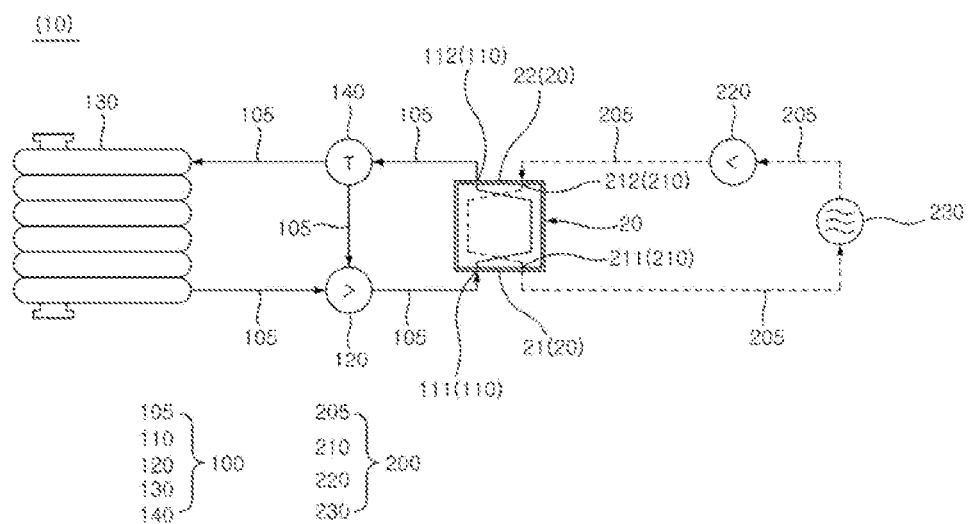
[FIG. 4]
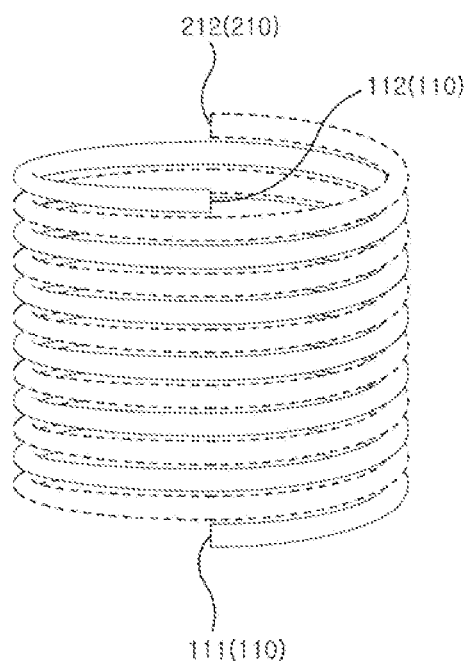

[FIG. 5]
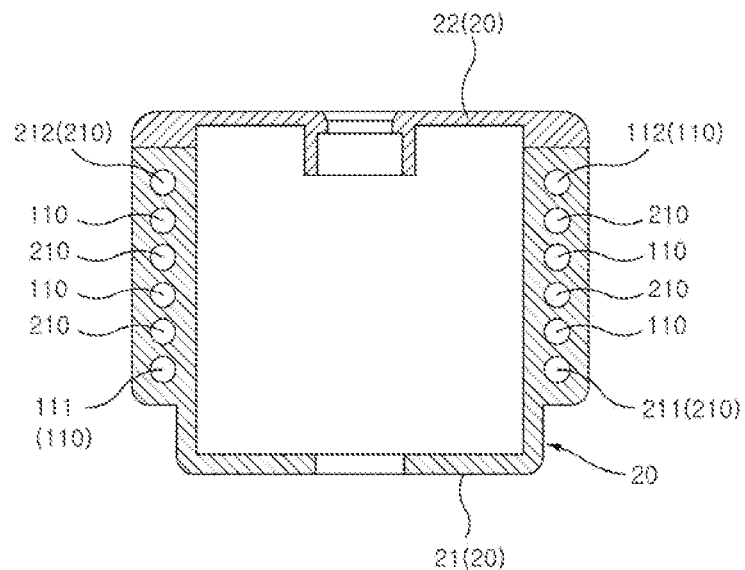
[FIG. 6]
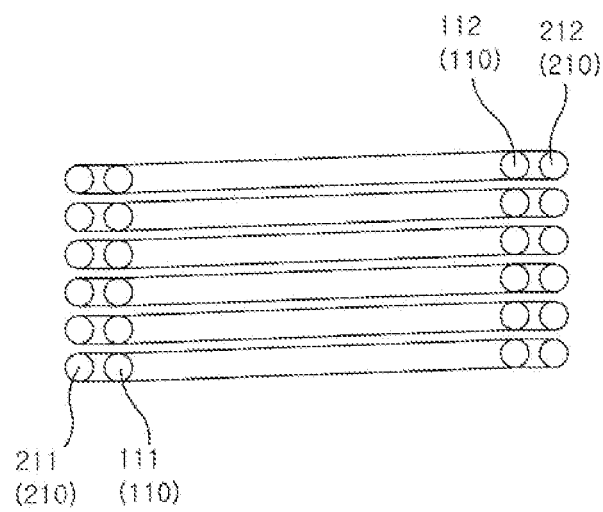

[FIG. 7]
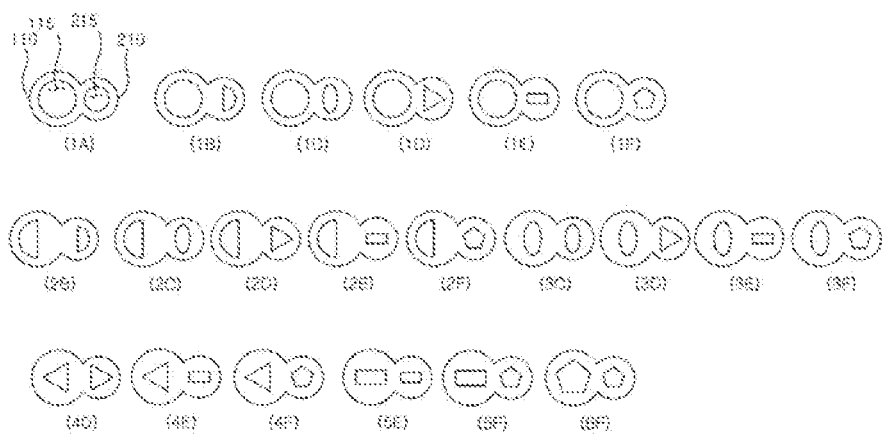
[FIG. 8]
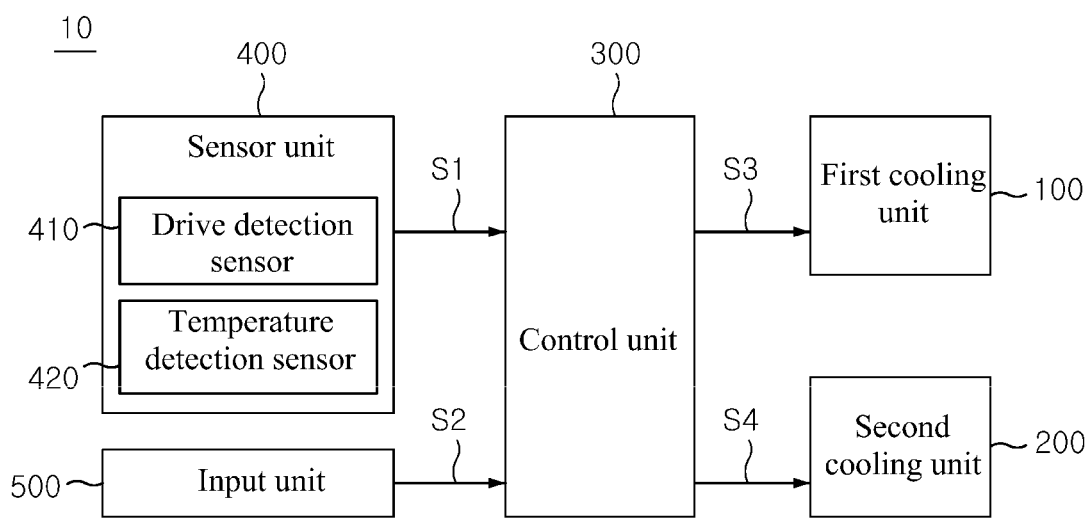

[FIG. 9]
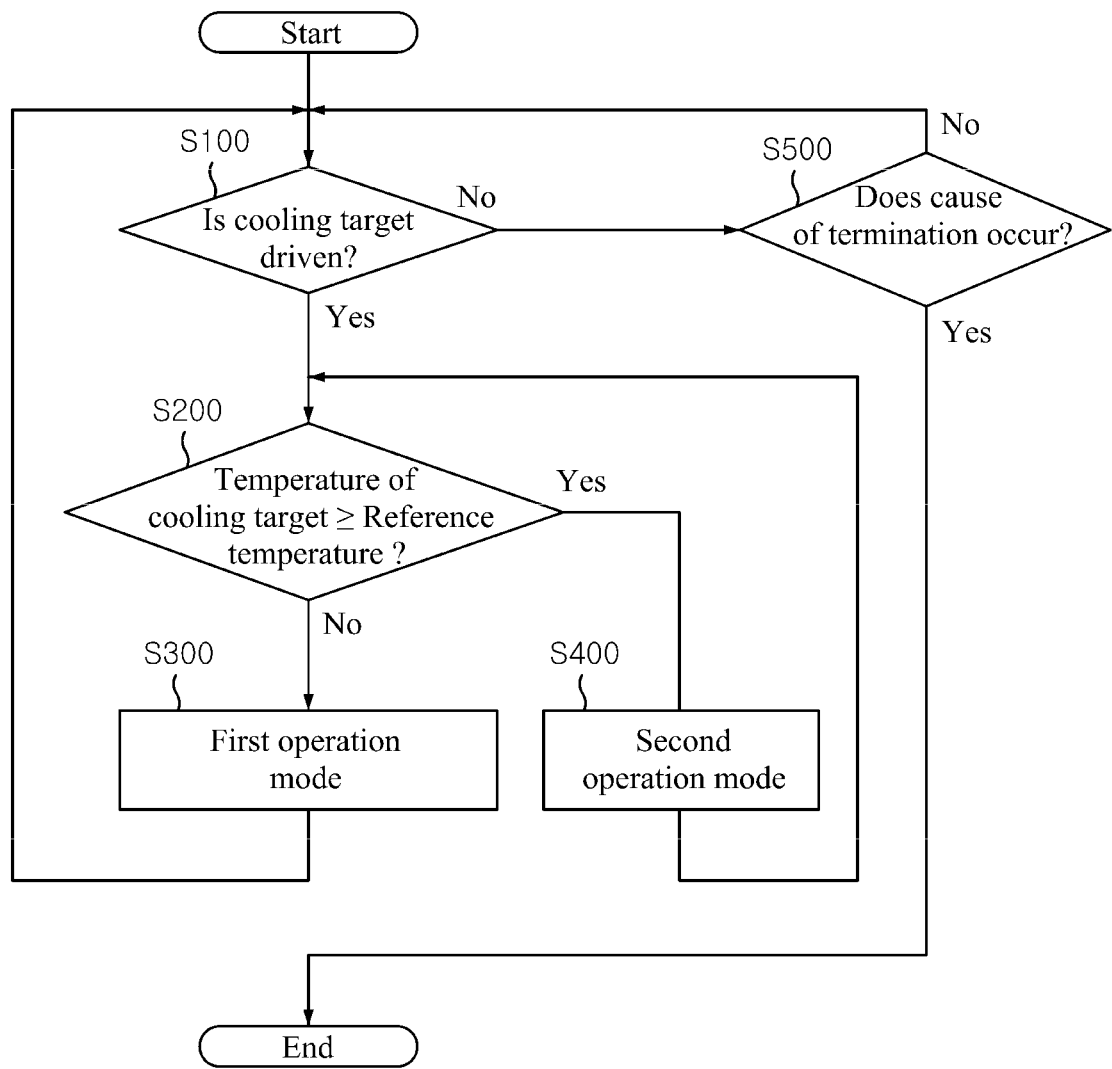

COOLING SYSTEM INCLUDING A PLURALITY OF COOLING UNITS

TECHNICAL FIELD

The present disclosure relates to a cooling system. More specifically, the present disclosure relates to a cooling system including a plurality of cooling units.

BACKGROUND ART

An existing motor housing may be provided with one cooling channel (or cooling unit) and may be cooled. A refrigerant may cool the motor housing by a pump, and the heated refrigerant may be passively cooled in a radiator and may be used to cool the motor housing again. However, since a temperature of a coolant cooled in the radiator is quite high, it may be difficult to stably cool a motor.

A method may be considered to cool the motor housing by actively cooling the heated refrigerant using electric power. However, when the refrigerant is cooled using separate electric power as described above, the overall efficiency of the corresponding system may be relatively low.

[Patent Document 1] Korean Patent No. 10-1410438

DISCLOSURE

Technical Problem

An object of the present disclosure is to address the above-described and other problems.

Another object of the present disclosure is to provide a cooling system including a plurality of cooling units to cool a cooling target.

Another object of the present disclosure is to provide a first cooling unit for passively cooling a first refrigerant.

Another object of the present disclosure is to provide a second cooling unit for actively cooling a second refrigerant.

Another object of the present disclosure is to provide a cooling system including a first cooling unit and a second cooling unit.

Another object of the present disclosure is to provide a cooling system for introducing a first refrigerant into a first side of a cooling target and introducing a second refrigerant into a second side of the cooling target.

Another object of the present disclosure is to provide a cooling system that operates a first cooling unit and a second cooling unit depending on a temperature of a cooling object.

Another object of the present disclosure is to provide a cooling system with relatively high cooling efficiency.

Technical Solution

In order to achieve the above-described and other objects, in one aspect of the present disclosure, there is provided a cooling system comprising a first cooling unit installed at a cooling target, the first cooling unit including a first cooling pipe forming a flow path of a first refrigerant; and a second cooling unit installed at the cooling target, the second cooling unit including a second cooling pipe forming a flow path of a second refrigerant, wherein the first cooling pipe includes a first cooling pipe first end adjacent to a first side of the cooling target, the first refrigerant being introduced into the first cooling pipe first end; and a first cooling pipe second end adjacent to a second side of the cooling target, the first refrigerant being discharged from the first cooling pipe second end, wherein the second cooling pipe includes a second cooling pipe first end adjacent to the first side of the cooling target, the second refrigerant being discharged from the second cooling pipe first end; and a second cooling pipe second end adjacent to the second side of the cooling target, the second refrigerant being introduced into the second cooling pipe second end.

In another aspect of the present disclosure, there is provided a cooling system operating method (S10) of cooling a cooling target using a cooling system including a control unit, the cooling system operating method (S10) comprising a step (S100) for the control unit to determine whether the cooling target is driven (operated); a step (S200) for the control unit to compare a temperature of the cooling target with a reference temperature; a step (S300) for the control unit to drive the cooling system in a first operation mode when the cooling target is driven and the temperature of the control target is less than the reference temperature; and a step (400) for the control unit to drive the cooling system in a second operation mode when the cooling target is driven and the temperature of the control target is equal to or greater than the reference temperature.

Advantageous Effects

Effects of a cooling system according to the present disclosure are described as follows.

According to at least one embodiment of the present disclosure, the present disclosure can provide a cooling system including a plurality of cooling units to cool a cooling target.

According to at least one embodiment of the present disclosure, the present disclosure can provide a first cooling unit for passively cooling a first refrigerant.

According to at least one embodiment of the present disclosure, the present disclosure can provide a second cooling unit for actively cooling a second refrigerant.

According to at least one embodiment of the present disclosure, the present disclosure can provide a cooling system including a first cooling unit and a second cooling unit.

According to at least one embodiment of the present disclosure, the present disclosure can provide a cooling system for introducing a first refrigerant into a first side of a cooling target and introducing a second refrigerant into a second side of the cooling target.

According to at least one embodiment of the present disclosure, the present disclosure can provide a cooling system that operates a first cooling unit and a second cooling unit depending on a temperature of a cooling object.

According to at least one embodiment of the present disclosure, the present disclosure can provide a cooling system with relatively high cooling efficiency.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

DESCRIPTION OF DRAWINGS

FIG. 1 illustrates a cooling system according to an embodiment of the present disclosure.

FIG. 2 illustrates a second cooling unit according to an embodiment of the present disclosure.

FIG. 3 illustrates a cooling system according to an embodiment of the present disclosure.

FIG. 4 illustrates a first cooling pipe and a second cooling pipe according to an embodiment of the present disclosure.

FIG. 5 illustrates a cross section cutting a cooling target provided with a cooling pipe according to an embodiment of the present disclosure.

FIG. 6 illustrates a cross section cutting a cooling pipe according to an embodiment of the present disclosure.

FIG. 7 illustrates a cross section of a cooling pipe illustrated in FIG. 6.

FIG. 8 is a block diagram of a cooling system according to an embodiment of the present disclosure.

FIG. 9 is a flow chart illustrating a method of operating a cooling system according to an embodiment of the present disclosure.

MODE FOR INVENTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected with other layers, areas, and components intervening between them. For example, when layers, areas, components, etc. are electrically connected, the present disclosure includes both the case where layers, areas, and components are directly electrically connected, and the case where layers, areas, and components are indirectly electrically connected with other layers, areas, and components intervening between them.

FIG. 1 illustrates a cooling system 10 according to an embodiment of the present disclosure. The cooling system 10 may include a first cooling unit 100. The first cooling unit 100 may lower a temperature of a cooling target 20. The cooling target 20 may be, for example, a motor. For example, the cooling target 20 may include a motor housing. The cooling target 20 may be, for example, an engine.

The cooling target 20 may include a cooling target first side 21. The cooling target first side 21 may be referred to as "a first side of the cooling target". For example, the cooling target first side 21 may indicate a lower end of the cooling target 20. The cooling target 20 may include a cooling target second side 22. The cooling target second side 22 may be referred to as "a second side of the cooling target". For example, the cooling target second side 22 may be an opposite side of the cooling target first side 21. For example, the cooling target second side 22 may indicate an upper end of the cooling target 20.

The first cooling unit 100 may provide a refrigerant (or coolant) to the cooling target 20. A temperature of the refrigerant provided to the cooling target 20 may be lower than the temperature of the cooling target 20. The refrigerant provided to the cooling target 20 may be discharged from the cooling target 20 after the heat exchange with the cooling target 20. The refrigerant of the first cooling unit 100 may be referred to as a "first refrigerant". The first refrigerant may be, for example, water.

The first cooling unit 100 may include a first connection pipe 105. The first connection pipe 105 may be a flow path of the first refrigerant. A plurality of first connection pipes 105 may be provided. The first connection pipe 105 may connect components of the first cooling unit 100.

The first cooling unit 100 may include a first cooling pipe 110. The first cooling pipe 110 may be positioned at the cooling target 20. The first cooling pipe 110 may extend from the cooling target first side 21 and lead to the cooling target second side 22. The first cooling pipe 110 may form a flow path through which the first refrigerant flows.

The first cooling pipe 110 may include a first cooling pipe first end 111. The first cooling pipe first end 111 may be adjacent to the cooling target first side 21. The first cooling pipe 110 may include a first cooling pipe second end 112. The first cooling pipe second end 112 may be adjacent the cooling target second side 22. The first cooling pipe 110 may extend from the first cooling pipe first end 111 and lead to the first cooling pipe second end 112.

The first cooling unit 100 may include a first pump 120. The first connection pipe 105 may connect the first pump 120 to the first cooling pipe 110. The first pump 120 may provide pressure to the first refrigerant. For example, when the first pump 120 operates, the first refrigerant may move from the first pump 120 to the first cooling pipe 110. For example, when the first pump 120 applies pressure to the first refrigerant, the first refrigerant may flow in the first cooling pipe 110.

The first refrigerant may move from the first pump 120 to the first cooling pipe first end 111. The first refrigerant may receive heat from the cooling target 20 while moving from the first cooling pipe first end 111 to the first cooling pipe second end 112. A temperature of the first refrigerant at the first cooling pipe second end 112 may be higher than a temperature of the first refrigerant at the first cooling pipe first end 111.

The first cooling unit 100 may include a first cooling module 130. The first connection pipe 105 may connect the first cooling module 130 to the first cooling pipe second end 112. The first cooling module 130 may receive the first refrigerant discharged from the first cooling pipe second end 112. The first cooling module 130 may lower the temperature of the first refrigerant.

The first cooling module 130 may include a passive heat exchanger. For example, the first cooling module 130 may not consume separate power for cooling the first refrigerant. For example, the first cooling module 130 may include a radiator.

The first cooling unit 100 may include a flow path distributor 140. The flow path distributor 140 may include, for example, a thermostat. The first connection pipe 105 may connect the flow path distributor 140 and the first cooling pipe second end 112. The first connection pipe 105 may connect the flow path distributor 140 and the first cooling module 130. The first connection pipe 105 may connect the flow path distributor 140 and the first pump 120.

The flow path distributor 140 may receive the first refrigerant from the first cooling pipe second end 112. According to the operation of the flow path distributor 140, the first refrigerant reaching the flow path distributor 140 is transferred to the first cooling module 130 or transferred to the first pump 120. That is, the first refrigerant reaching the flow path distributor 140 may be transferred to the first cooling module 130, cooled by the first cooling module 130, and then transferred to the first pump 120, or may be directly transferred to the first pump 120. In this context, the first connection pipe connecting the flow path distributor 140 and the first pump 120 may be referred to as a "by-pass" or a "bypass".

The flow path distributor 140 may determine a flow path depending on the temperature of the first refrigerant at the first cooling pipe second end 112. For example, when the temperature of the first refrigerant at the first cooling pipe second end 112 is higher than a predetermined temperature, the flow path distributor 140 may form a flow path including the first cooling module 130. For example, when the temperature of the first refrigerant at the first cooling pipe second end 112 is less than or equal to a predetermined temperature, the flow path distributor 140 may form a flow path including the first pump 120.

The first cooling pipe 110, the first pump 120, and the first cooling module 130 may form a closed loop. The loop formed by the first cooling pipe 110, the first pump 120, and the first cooling module 130 may be referred to as a "first loop". The first refrigerant to which the pressure is provided by the first pump 120 may be introduced into the first cooling pipe 110 to receive heat, and may be introduced into the first cooling module 130 to dissipate heat.

FIG. 2 illustrates a second cooling unit 200 according to an embodiment of the present disclosure. The second cooling unit 200 may cool a cooling target 20. The cooling target 20 illustrated in FIG. 2 may be the same as the cooling target 20 illustrated in FIG. 1.

The second cooling unit 200 may provide a refrigerant to the cooling target 20. The refrigerant provided by the second cooling unit 200 may be referred to as a "second refrigerant". The second refrigerant may be, for example, a fluid. The second refrigerant may be introduced into the cooling target 20 to receive heat from the cooling target 20.

The second cooling unit 200 may include a second cooling pipe 210. The second cooling pipe 210 may extend from a second cooling pipe first end 211 and lead to a second cooling pipe second end 212. The second cooling pipe first end 211 may be adjacent to the cooling target first side 21. The second cooling pipe second end 212 may be adjacent the cooling target second side 22.

The second cooling unit 200 may include a second connection pipe 205. The second connection pipe 205 may connect components of the second cooling unit 200. A plurality of second connection pipes 205 may be provided.

The second cooling unit 200 may include a second pump 220. The second pump 220 may provide pressure to the second refrigerant. For example, when the second pump 220 applies pressure to the second refrigerant, the second refrigerant may flow in the second cooling pipe 210. The second connection pipe 205 may connect the second pump 220 and the second cooling pipe 210.

The second cooling unit 200 may include a second cooling module 230. The second connection pipe 205 may connect the second cooling module 230 and the second pump 220. The second connection pipe 205 may connect the second cooling module 230 and the second cooling pipe 210.

The second cooling module 230 may receive the second refrigerant discharged from the second cooling pipe 210. The second cooling module 230 may cool the second refrigerant. The second cooling module 230 may include, for example, an active heat exchanger. For example, the second cooling module 230 may consume separate power to cool the second refrigerant. For example, the second cooling module 230 may include an air-conditioner.

The second cooling pipe 210, the second pump 220, and the second cooling module 230 may form a closed loop. The loop formed by the second cooling pipe 210, the second pump 220, and the second cooling module 230 may be referred to as a "second loop". The second refrigerant to which the pressure is provided by the second pump 220 may be introduced into the second cooling pipe 210 to receive heat, and may be introduced into the second cooling module 230 to dissipate heat.

FIG. 3 illustrates a cooling system 10 according to an embodiment of the present disclosure. In FIG. 3, a first loop may be indicated by a solid line, and a second loop may be indicated by a dotted line.

Referring to FIG. 3, a cooling system 10 according to an embodiment of the present disclosure may include a first cooling unit 100 and a second cooling unit 200. The first cooling unit 100 and the second cooling unit 200 may cool a cooling target 20. In this context, the cooling system 10 according to an embodiment of the present disclosure may be referred to as "a cooling system including a plurality of cooling units".

Configuration of the first cooling unit 100 may be substantially the same as the configuration of the first cooling unit 100 illustrated in FIG. 1. Configuration of the second cooling unit 200 may be substantially the same as the configuration of the second cooling unit 200 illustrated in FIG. 2. A first cooling pipe 110 and a second cooling pipe 210 may be positioned or installed at the cooling target 20.

For example, a first cooling pipe first end 111 may be positioned at a cooling target first side 21. For example, a first cooling pipe second end 112 may be positioned at a cooling target second side 22. For example, a first refrigerant may be introduced into the first cooling pipe first end 111, may exchange heat with the cooling target 20, and may be discharged to the first cooling pipe second end 112.

For example, a second cooling pipe second end 212 may be positioned at the cooling target second side 22. For example, a second cooling pipe first end 211 may be positioned at the cooling target first side 21. For example, the second refrigerant may be introduced into the second cooling pipe second end 212, may exchange heat with the cooling target 20, and may be discharged to the second cooling pipe first end 211.

FIG. 4 illustrates a first cooling pipe 110 and a second cooling pipe 210 according to an embodiment of the present disclosure. FIG. 5 illustrates a cross section cutting a cooling target 20 provided with cooling pipes 110 and 210 according to an embodiment of the present disclosure. The cooling pipes 110 and 210 may indicate at least one of the first cooling pipe 110 and the second cooling pipe 210. In FIG. 4, the first cooling pipe 110 may be indicated by a solid line, and the second cooling pipe 210 may be indicated by a dotted line.

Referring to FIGS. 4 and 5, at least one of the first cooling pipe 110 and the second cooling pipe 210 may form a helix shape. For example, the first cooling pipe 110 and the second cooling pipe 210 may be alternately disposed in an up-down direction. Due to such a shape, the cooling pipes 110 and 210 can effectively remove heat from the cooling target 20.

The second cooling pipe first end 211 may be adjacent to the first cooling pipe first end 111. For example, the second cooling pipe first end 211 and the first cooling pipe first end 111 may be positioned at the cooling target first side 21 (see FIG. 3).

The second cooling pipe second end 212 may be adjacent to the first cooling pipe second end 112. For example, the second cooling pipe second end 212 and the first cooling pipe second end 112 may be positioned at the cooling target second side 22 (see FIG. 3).

Referring to FIGS. 3 to 5, a process in which the cooling system 10 cools the cooling target 20 will be described. When the cooling target 20 operates, a temperature of the cooling target 20 may increase. The temperature of the cooling target 20 needs to be maintained below a predetermined level.

When the cooling target 20 operates, the first cooling unit 100 may operate. The first cooling unit 100 may obtain heat from the cooling target 20. The first refrigerant introduced into the first cooling pipe first end 111 may receive heat from the cooling target 20. The temperature of the first refrigerant discharged from the first cooling pipe second end 112 may be higher than the temperature of the first refrigerant introduced into the first cooling pipe first end 111. Accordingly, a temperature of the cooling target second side 22 may be higher than a temperature of the cooling target first side 21. That is, the cooling efficiency at the cooling target second side 22 may be lower than the cooling efficiency at the cooling target first side 21.

The second refrigerant may be introduced into the second cooling pipe second end 212. That is, the second refrigerant may be introduced into the cooling target second side 22 and may receive heat from the cooling target 20. Therefore, according to the operation of the first cooling unit 100, a disadvantage in that the cooling efficiency at the cooling target second side 22 is lower than the cooling efficiency at the cooling target first side 21 can be compensated by introducing the second refrigerant into the cooling target second side 22.

Despite the operation of the first cooling unit 100, the temperature of the cooling target 20 may exceed a predetermined temperature. In this case, the second cooling unit 200 may operate. Hence, the temperature of the cooling target 20 can be stably maintained at the predetermined temperature.

FIG. 6 illustrates a cross section cutting the cooling pipes 110 and 210 according to an embodiment of the present disclosure.

Referring to FIG. 6, the first cooling pipe 110 and the second cooling pipe 210 may be connected or coupled to each other. The first cooling pipe 110 and the second cooling pipe 210 may form a shape extended along the same trace. The first cooling pipe 110 and the second cooling pipe 210 may form a helix shape.

The first cooling pipe 110 and the second cooling pipe 210 may form a layer in a radial direction. For example, the second cooling pipe 210 may be positioned radially outside the first cooling pipe 110. Due to this shape, the first cooling pipe 110 can mainly remove heat from the cooling target 20 (see FIG. 5), and the second cooling pipe 210 can remove heat from the first cooling pipe 110 and the cooling target 20 (see FIG. 5).

FIG. 7 illustrates a cross section of the cooling pipes 110 and 210 illustrated in FIG. 6. With reference to FIG. 7, cross sections of the cooling pipes 110 and 210 according to serval embodiments of the present disclosure may be observed.

For example, a cross section of a first cooling pipe hollow portion 115 that is a hollow portion of the first cooling pipe 110 may be observed. For example, a cross section of a second cooling pipe hollow portion 215 that is a hollow portion of the second cooling pipe 210 may be observed. For example, the second cooling pipe 210 may be positioned radially outside the first cooling pipe 110.

A cross-sectional area of the first cooling pipe hollow portion 115 may be different from a cross-sectional area of the second cooling pipe hollow portion 215. For example, the cross-sectional area of the first cooling pipe hollow portion 115 may be greater than the cross-sectional area of the second cooling pipe hollow portion 215.

Referring to (1A), (1B), (1C), (1D), (1E), and (1F) of FIG. 7, the cross section of the first cooling pipe hollow portion 115 may be a circle.

Referring to (1A), (1B), (1C), (1D), (1E), and (1F) of FIG. 7, the cross section of the second cooling pipe hollow portion 215 may be a circle, a semicircle, an ellipse, or a polygon (e.g., triangle, rectangle, pentagon, etc.).

Referring to (2B), (2C), (2D), (2E), and (2F) of FIG. 7, the cross section of the first cooling pipe hollow portion 115 may be a semicircle.

Referring to (2B), (2C), (2D), (2E), and (2F) of FIG. 7, the cross section of the second cooling pipe hollow portion 215 may be a semicircle, an ellipse, or a polygon (e.g., triangle, rectangle, pentagon, etc.).

Referring to (3C), (3D), (3E), and (3F) of FIG. 7, the cross section of the first cooling pipe hollow portion 115 may be an ellipse.

Referring to (3C), (3D), (3E), and (3F) of FIG. 7, the cross section of the second cooling pipe hollow portion 215 may be an ellipse or a polygon (e.g., triangle, rectangle, pentagon, etc.).

Referring to (4D), (4E), and (4F) of FIG. 7, the cross section of the first cooling pipe hollow portion 115 may be a triangle.

Referring to (4D), (4E), and (4F) of FIG. 7, the cross section of the second cooling pipe hollow portion 215 may be a polygon (e.g., triangle, rectangle, pentagon, etc.).

Referring to (5E) and (5F) of FIG. 7, the cross section of the first cooling pipe hollow portion 115 may be a rectangle.

Referring to (5E) and (5F) of FIG. 7, the cross section of the second cooling pipe hollow portion 215 may be a rectangle or a pentagon.

Referring to (6E) of FIG. 7, the cross section of the first cooling pipe hollow portion 115 may be a pentagon.

Referring to (6E) of FIG. 7, the cross section of the second cooling pipe hollow portion 215 may be a pentagon.

FIG. 8 is a block diagram of the cooling system 10 according to an embodiment of the present disclosure.

Referring to FIG. 8, the cooling system 10 may include a control unit 300. The control unit 300 may process signals. The control unit 300 may perform operations. The control unit 300 may be implemented as a computer, a server, a processor, a printed circuit board (PCB), and the like.

The cooling system 10 may include a sensor unit 400. The sensor unit 300 may include a drive detection sensor 410. The drive detection sensor 410 may detect whether the cooling target 20 (see FIG. 3) is driven (or operated). The sensor unit 300 may include a temperature detection sensor 420. The temperature detection sensor 420 may measure a temperature of the cooling target 20 (see FIG. 3).

The sensor unit 400 may generate a first signal S1. The first signal S1 may include at least one of information about whether to drive (or operate) the cooling target 20 (see FIG. 3) and information about the temperature of the cooling target 20 (see FIG. 3). The first signal S1 may be provided to the control unit 300.

The cooling system 10 may include an input unit 500. The input unit 500 may obtain an input from a user or an operator. The input unit 500 may generate a second signal S2. The second signal S2 may include information on the input.

The input signals S1 and S2 may include at least one of the first signal S1 and the second signal S2. The control unit 300 may generate output signals S3 and S4 based on the input signals S1 and S2. The output signals S3 and S4 may include information about an operation command of the cooling system 10. The output signals S3 and S4 may include at least one of a third signal S3 and a fourth signal S4.

The control unit 300 may provide the third signal S3 to the first cooling unit 100. The first cooling unit 100 may operate the first pump 120 (see FIG. 3) and the flow path distributor 140 (see FIG. 3) in response to the third signal S3.

The control unit 300 may provide the fourth signal S4 to the second cooling unit 200. The second cooling unit 200 may operate the second pump 220 (see FIG. 3) and the second cooling module 230 (see FIG. 3) in response to the fourth signal S4.

FIG. 9 is a flow chart illustrating a method S10 of operating a cooling system according to an embodiment of the present disclosure. FIG. 9 may be described together with FIGS. 1 to 8.

Referring to FIGS. 1 to 9, the cooling system operating method S10 may comprise a step S100 of determining whether a cooling target is driven. This step S100 may be performed by the control unit 300. The drive detection sensor 410 may detect whether the control target 20 is driven (operated). The control unit 300 may determine whether the control target 20 is driven (operated) based on the first signal S1.

The cooling system operating method S10 may comprise a step S200 of comparing a temperature of the cooling target 20 with a reference temperature. This step S200 may be performed when it is determined that the cooling target is driven (operated). This step S200 may be performed by the control unit 300.

The temperature detection sensor 420 may measure the temperature of the control target 20. The control unit 300 may acquire (or extract) temperature information of the control target 20 based on the first signal S1. In this step S200, the control unit 300 may compare the temperature of the cooling target 20 with the reference temperature.

The cooling system operating method S10 may comprise a first operation mode performing step S300. This step S300 may be performed when it is determined that the temperature of the control target 20 is less than the reference temperature. In this step S300, the control unit 300 may operate the first cooling unit 100 and cool the cooling target 20. The control unit 300 may continuously determine whether the cooling target 20 is driven while the cooling system 10 operates in the first operation mode. If it is determined that the cooling target 20 is being driven while the cooling system 10 operates in the first operation mode, and the temperature of the cooling target 20 is equal to or greater than the reference temperature, the control unit 300 may operate the second cooling unit 200 and drive the cooling system 10 in the second operation mode.

The cooling system operating method S10 may comprise a second operation mode performing step S400. This step S400 may be performed when it is determined that the temperature of the control target 20 is equal to or greater than the reference temperature. In this step S400, the control unit 300 may operate the first cooling unit 100 and the second cooling unit 200 and cool the cooling target 20. The control unit 300 may continuously compare the temperature of the cooling target 20 with the reference temperature while the cooling system 10 operates in the second operation mode. If it is determined that the temperature of the cooling target 20 is less than the reference temperature while the cooling system 10 operates in the second operation mode, the control unit 300 may terminate the operation of the second cooling unit 200 and drive the cooling system 10 in the first operation mode.

The control unit 300 may compare the temperature of the cooling target 20 with the reference temperature to determine the operation mode of the cooling system 10. The operation mode of the cooling system 10 may indicate at least one of the first operation mode and the second operation mode.

The cooling system operating method S10 may comprise a step S500 of determining whether a cause of termination occurs. This step S500 may be performed by the control unit 300. This step S500 may be performed when it is determined that the cooling target 20 is not driven (operated). When it is determined that the cause of termination has occurred in the cooling system operating method S10, the control unit 300 may terminate the cooling system operating method S10. When it is determined that the cause of termination has not occurred in the cooling system operating method S10, the control unit 300 may determine whether the cooling target 20 is driven (operated).

Some embodiments or other embodiments of the present disclosure described above are not mutually exclusive or distinct from each other. Configurations or functions of some embodiments or other embodiments of the present disclosure described above can be used together or combined with each other.

It is apparent to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

The invention claimed is:

1. A cooling system comprising:
a first cooling unit installed at a cooling target, the first cooling unit including a first cooling pipe forming a flow path of a first refrigerant; and
a second cooling unit installed at the cooling target, the second cooling unit including a second cooling pipe forming a flow path of a second refrigerant,
wherein the first cooling pipe includes:
a first cooling pipe first end positioned at a first side of the cooling target, the first cooling pipe first end being configured to receive the first refrigerant; and
a first cooling pipe second end positioned at a second side of the cooling target, the first cooling pipe second end being configured to discharge the first refrigerant, and
wherein the second cooling pipe includes:
a second cooling pipe first end positioned at the first side of the cooling target, the second cooling pipe first end configured to discharge the second refrigerant; and
a second cooling pipe second end positioned at the second side of the cooling target, the second cooling pipe second end being configured to receive the second refrigerant.

2. The cooling system of claim 1, wherein the first cooling unit further includes:
a first pump connected to the first cooling pipe and configured to provide a pressure to the first refrigerant; and
a first cooling module connected to the first cooling pipe and configured to cool the first refrigerant, and
wherein the second cooling unit further includes:
a second pump connected to the second cooling pipe and configured to provide a pressure to the second refrigerant; and
a second cooling module connected to the second cooling pipe and configured to cool the second refrigerant.

3. The cooling system of claim 2, wherein the first cooling pipe, the first pump, and the first cooling module form a first loop that is a closed loop, and
wherein the second cooling pipe, the second pump, and the second cooling module form a second loop that is a closed loop.

4. The cooling system of claim 3, wherein the first cooling module includes a passive heat exchanger, and wherein the second cooling module includes an active heat exchanger.

5. The cooling system of claim 4, further comprising:
a sensor unit configured to generate an input signal, the sensor unit including a drive detection sensor configured to detect whether the cooling target is driven, and a temperature detection sensor configured to measure a temperature of the cooling target; and
a control unit connected to the sensor unit, the first cooling unit, and the second cooling unit,
wherein the control unit is configured to generate an output signal based on the input signal and provide the output signal to at least one of the first cooling unit and the second cooling unit.

6. The cooling system of claim 5, wherein the output signal includes at least one of:
a third signal related to an operation of the first cooling unit; and
a fourth signal related to an operation of the second cooling unit.

7. The cooling system of claim 5, wherein the control unit is configured to operate the first cooling unit when the cooling target is driven and the temperature of the cooling target is less than a reference temperature, and
wherein the control unit is configured to operate the first cooling unit and the second cooling unit when the cooling target is driven and the temperature of the cooling target is equal to or greater than the reference temperature.

8. The cooling system of claim 1, wherein the first cooling pipe is formed to extend from the first cooling pipe first end and lead to the first cooling pipe second end, and
wherein the second cooling pipe is formed to extend from the second cooling pipe first end and lead to the second cooling pipe second end.

9. The cooling system of claim 8, wherein the first cooling pipe and the second cooling pipe form a helix shape and are alternately disposed in a direction from the first side toward the second side of the cooling target.

10. The cooling system of claim 8, wherein the first cooling pipe and the second cooling pipe form a helix shape, and
wherein the second cooling pipe is positioned radially outside the first cooling pipe.

11. The cooling system of claim 1, wherein the first cooling pipe forms a first cooling pipe hollow portion as a hollow portion therein, and
wherein the second cooling pipe forms a second cooling pipe hollow portion as a hollow portion therein.

12. The cooling system of claim 11, wherein a cross-sectional area of the first cooling pipe hollow portion is greater than a cross-sectional area of the second cooling pipe hollow portion.

13. The cooling system of claim 11, wherein a cross-sectional shape of the first cooling pipe hollow portion is one of a circle, a semicircle, an ellipse, and a polygon, and
wherein a cross-sectional shape of the second cooling pipe hollow portion is one of a circle, a semicircle, an ellipse, and a polygon.

* * * * *